US012583182B2

(12) United States Patent
Endo

(10) Patent No.: US 12,583,182 B2
(45) Date of Patent: Mar. 24, 2026

(54) INFORMATION PROCESSING APPARATUS, THREE-DIMENSIONAL SHAPING SYSTEM, AND INFORMATION DISPLAY METHOD

(71) Applicant: SEIKO EPSON CORPORATION, Tokyo (JP)

(72) Inventor: Wataru Endo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 631 days.

(21) Appl. No.: 17/658,671

(22) Filed: Apr. 11, 2022

(65) Prior Publication Data

US 2022/0324176 A1     Oct. 13, 2022

(30) Foreign Application Priority Data

Apr. 13, 2021     (JP) ................................. 2021-067793

(51) Int. Cl.
| | |
|---|---|
| *B29C 64/393* | (2017.01) |
| *B29C 64/209* | (2017.01) |
| *B29C 64/321* | (2017.01) |
| *B33Y 50/02* | (2015.01) |
| *B33Y 30/00* | (2015.01) |

(52) U.S. Cl.
CPC .......... *B29C 64/393* (2017.08); *B29C 64/209* (2017.08); *B29C 64/321* (2017.08); *B33Y 50/02* (2014.12); *B33Y 30/00* (2014.12)

(58) Field of Classification Search
None
See application file for complete search history.

(56) References Cited

U.S. PATENT DOCUMENTS

| | | | | |
|---|---|---|---|---|
| 9,950,516 | B1 * | 4/2018 | Hsieh ................... | B41J 2/04586 |
| 11,257,296 | B2 * | 2/2022 | Sumi ..................... | G06F 3/1256 |
| 2015/0134095 | A1 * | 5/2015 | Hemani ................. | G06T 19/00 |
| | | | | 700/98 |
| 2015/0355625 | A1 * | 12/2015 | Cronie ..................... | G06T 7/74 |
| | | | | 382/141 |
| 2017/0023929 | A1 * | 1/2017 | Matsuda ............... | B29C 64/393 |
| 2018/0079141 | A1 | 3/2018 | Yoshida et al. | |

(Continued)

FOREIGN PATENT DOCUMENTS

| | | |
|---|---|---|
| CN | 111231306 | 11/2019 |
| CN | 112008981 | 12/2020 |

(Continued)

*Primary Examiner* — Howard Cortes
(74) *Attorney, Agent, or Firm* — WORKMAN NYDEGGER

(57) ABSTRACT

An information processing apparatus includes a display control unit configured to cause, based on shaping data, a display unit to display a display screen including a first display region and a second display region. The shaping data is generated based on first shape data representing a shape of a three-dimensional shaped object and includes route information representing a movement route of a discharge unit that moves while discharging a shaping material and discharge amount information representing a discharge amount of the shaping material in the movement route. On the first display region, at least a part of second shape data representing the shape of the three-dimensional shaped object and including the route information is displayed, and on the second display region, at least a part of information included in the shaping data is displayed.

8 Claims, 12 Drawing Sheets

(56) References Cited

U.S. PATENT DOCUMENTS

| | | | | |
|---|---|---|---|---|
| 2018/0150270 A1* | 5/2018 | Harayama | ............ | G06F 3/1205 |
| 2019/0061243 A1* | 2/2019 | Saito | ................. | B29C 64/35 |
| 2019/0243589 A1 | 8/2019 | Chen | | |
| 2019/0255772 A1* | 8/2019 | Mizukami | ............ | B29C 64/106 |
| 2019/0291184 A1* | 9/2019 | Buller | ................. | B29C 64/20 |
| 2019/0344511 A1* | 11/2019 | Hsieh | ................. | B29C 64/393 |
| 2020/0156323 A1* | 5/2020 | Woytowitz | ............ | B33Y 50/02 |
| 2020/0164589 A1 | 5/2020 | Yuwaki et al. | | |
| 2020/0376774 A1 | 12/2020 | Yamazaki | | |
| 2021/0124539 A1* | 4/2021 | Matysiak | ............ | G06F 3/1294 |
| 2021/0174594 A1* | 6/2021 | Huang | ................. | B22F 12/90 |
| 2021/0178701 A1 | 6/2021 | Yuwaki et al. | | |
| 2021/0248834 A1* | 8/2021 | Sumi | ................. | G06F 3/1259 |
| 2022/0347935 A1 | 11/2022 | Yuwaki et al. | | |
| 2023/0321915 A1* | 10/2023 | Steinberg | ............ | B29C 64/118 |

FOREIGN PATENT DOCUMENTS

| | | |
|---|---|---|
| JP | 2018-047623 A | 3/2018 |
| JP | 2019-025759 | 2/2019 |
| JP | 2019-139730 A | 8/2019 |
| WO | 2019/013751 | 7/2017 |

* cited by examiner

*FIG. 9*

```
Printer : xxx
Material : ABS
StageTemperature : 80
ChamberTemperature : 200
UpperHeaterTemperature : 200
BarrelTemperature[Inner] : 180
BarrelTemperature[Outer] : 180
ExtruderNumber : 1
ExtruderRotationSpeed : 3.20
NozzleNumber : 1
NozzleTemperature : 250
ScanSpeed : 6000
InjPressure : 50
...
```

DS2

DA1

DA2

INFORMATION PROCESSING APPARATUS, THREE-DIMENSIONAL SHAPING SYSTEM, AND INFORMATION DISPLAY METHOD

The present application is based on, and claims priority from JP Application Serial Number 2021-067793, filed Apr. 13, 2021, the disclosure of which is hereby incorporated by reference herein in its entirety.

BACKGROUND

1. Technical Field

The present disclosure relates to an information processing apparatus, a three-dimensional shaping system, and an information display method.

2. Related Art

With respect to a three-dimensional shaping system, JP-A-2018-47623 discloses a technique of generating, by a 3D printer, shaped object data representing a shaped object to be shaped, and displaying, based on the shaped object data, a preview image for an operator to check a shape or the like of the shaped object in advance.

By displaying the preview image as described in JP-A-2018-47623, it is possible to prevent shaping of a shaped object not intended by a user. However, in the preview image in the related arts, the user can only check the shape in advance, and it is difficult to check in advance detailed information related to three-dimensional shaping, such as shaping conditions and information for controlling a three-dimensional shaping apparatus.

SUMMARY

According to a first aspect of the present disclosure, an information processing apparatus is provided. The information processing apparatus includes a display control unit configured to cause, based on shaping data, a display unit to display a display screen including a first display region and a second display region. The shaping data is generated based on first shape data representing a shape of a three-dimensional shaped object and includes route information representing a movement route of a discharge unit that moves while discharging a shaping material and discharge amount information representing a discharge amount of the shaping material in the movement route. On the first display region, at least a part of second shape data representing the shape of the three-dimensional shaped object and including the route information is displayed, and on the second display region, at least a part of information included in the shaping data is displayed.

According to a second aspect of the present disclosure, a three-dimensional shaping system is provided. The three-dimensional shaping system includes the information processing apparatus and a three-dimensional shaping apparatus that acquires the shaping data and shapes the three-dimensional shaped object using the discharge unit.

According to a third aspect of the present disclosure, an information processing method is provided. The information processing method includes displaying, on a display unit, a display screen including a first display region and a second display region based on shaping data. The shaping data is generated based on first shape data representing a shape of a three-dimensional shaped object and includes route information representing a movement route of a discharge unit that moves while discharging a shaping material and discharge amount information representing a discharge amount of the shaping material in the movement route. On the first display region, at least a part of second shape data representing the shape of the three-dimensional shaped object and including the route information is displayed, and on the second display region, at least a part of information included in the shaping data is displayed.

BRIEF DESCRIPTION OF THE DRAWINGS

FIG. 9 is a diagram showing an example of a second display screen.

DESCRIPTION OF EXEMPLARY EMBODIMENTS

A. First Embodiment

Figure 1:
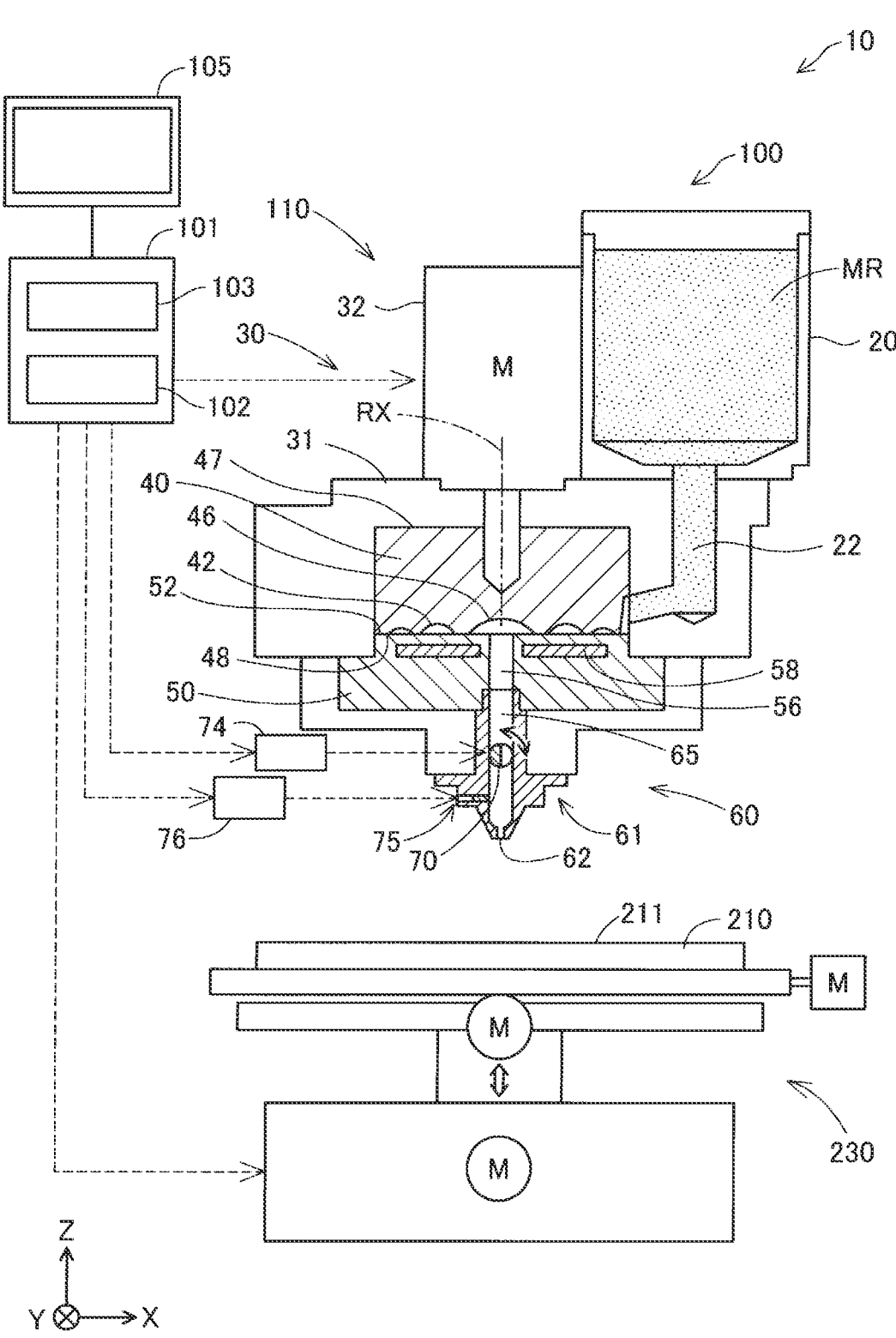
FIG. 1 is a diagram showing a schematic configuration of a three-dimensional shaping system.

FIG. 1 is a diagram showing a schematic configuration of a three-dimensional shaping system 10 according to a first embodiment. FIG. 1 shows arrows indicating X, Y, and Z directions that are orthogonal to each other. The X direction and the Y direction are directions parallel to a horizontal plane, and the Z direction is a direction along a vertically upward direction. The arrows indicating the X, Y, and Z directions are appropriately shown in other figures such that the shown directions correspond to those in FIG. 1. In the following description, when a direction is specified, a direction indicated by an arrow in each drawing is referred to as "+", a direction opposite thereto is referred to as "−", and a positive or negative sign is used in combination with a direction notation. Hereinafter, the +Z direction is also referred to as "upper", and the −Z direction is also referred to as "lower".

The three-dimensional shaping system 10 includes a three-dimensional shaping apparatus 100 and a control unit 101 that controls the three-dimensional shaping apparatus 100. The three-dimensional shaping apparatus 100 includes a shaping unit 110 that generates and discharges a shaping material, a shaping stage 210 as a base of a three-dimensional shaped object, and a moving mechanism 230 that controls a discharge position of the shaping material. The three-dimensional shaping apparatus 100 may be accommodated in a chamber (not shown).

Under the control of the control unit 101, the shaping unit 110 discharges, onto the stage 210, the shaping material in a form of a paste by melting a material in a solid state. The shaping unit 110 includes a material supply unit 20 as a supply source of the material before being converted into the shaping material, a shaping material generation unit 30 that converts the material into the shaping material, and a discharge unit 60 that discharges the shaping material.

The material supply unit 20 supplies a raw material MR for generating the shaping material to the shaping material generation unit 30. The material supply unit 20 is implemented by, for example, a hopper that accommodates the raw material MR. The material supply unit 20 has a discharge port on a lower side. The discharge port is coupled to the shaping material generation unit 30 via a communication path 22. The raw material MR is charged into the material supply unit 20 in a form of pellets, powder, or the like. In the present embodiment, a pellet-shaped ABS resin material is used.

The shaping material generation unit 30 melts the raw material MR supplied from the material supply unit 20 to generate the paste-like shaping material exhibiting fluidity, and guides the shaping material to the discharge unit 60. The shaping material generation unit 30 includes a screw case 31, a drive motor 32, a flat screw 40, and a screw facing portion 50. The flat screw 40 is also referred to as a rotor or a scroll, and the screw facing portion 50 is also referred to as a barrel.

Figure 2:
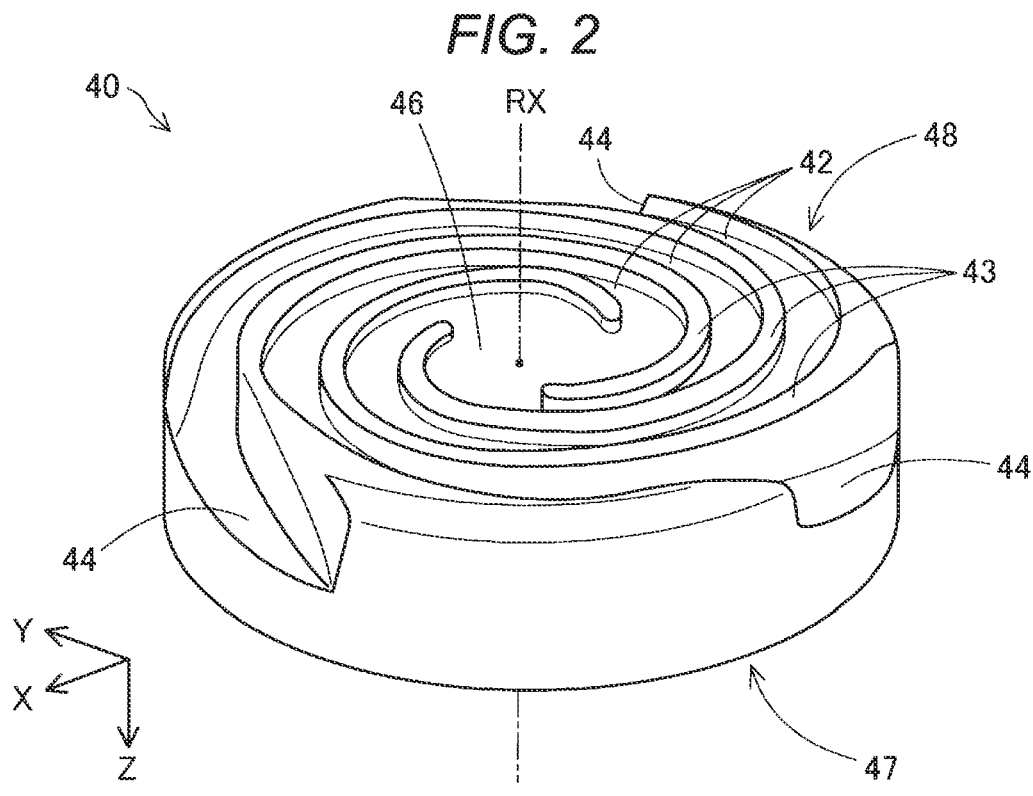
FIG. 2 is a perspective view showing a schematic configuration of a flat screw.
Figure 3:
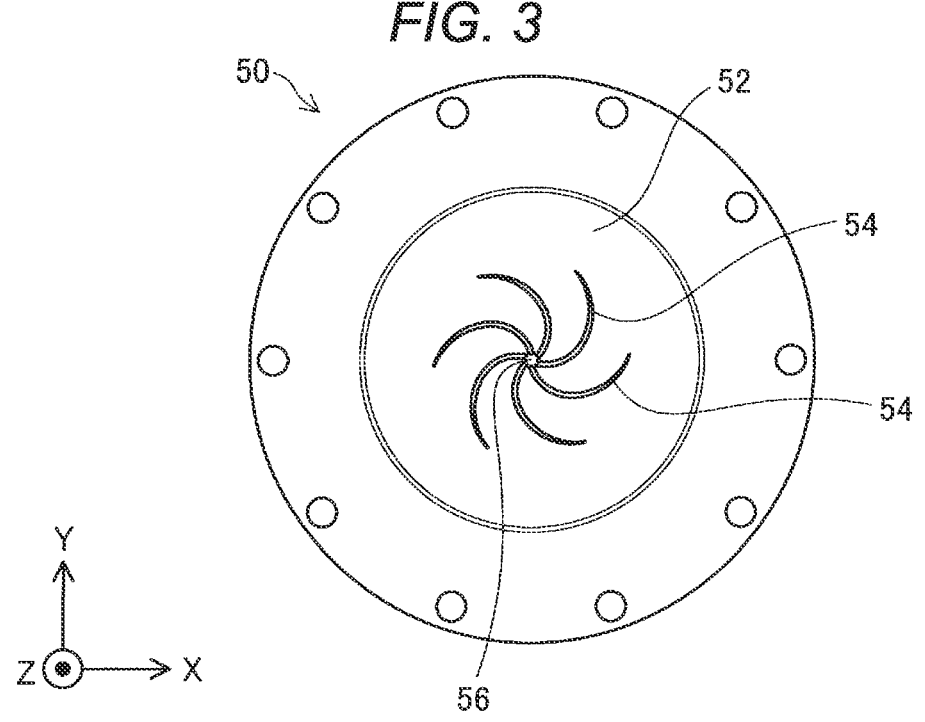
FIG. 3 is a schematic plan view of a screw facing portion.

FIG. 2 is a perspective view showing a schematic configuration of the flat screw 40 on a lower surface 48 side. In order to facilitate understanding of the technique, the flat screw 40 shown in FIG. 2 is shown in a state where a positional relationship between an upper surface 47 and a lower surface 48 shown in FIG. 1 is reversed in a vertical direction. FIG. 3 is a schematic plan view showing the screw facing portion 50 on an upper surface 52 side. The flat screw 40 has a substantially cylindrical shape in which a height in an axial direction, which is a direction along a central axis of the flat screw 40, is smaller than a diameter of the flat screw 40. The flat screw 40 is disposed such that a rotation axis RX serving as a rotation center of the flat screw 40 is parallel to the Z direction.

The flat screw 40 is housed in the screw case 31. An upper surface 47 side of the flat screw 40 is coupled to the drive motor 32, and the flat screw 40 is rotated in the screw case 31 by a rotational drive force generated by the drive motor 32. The drive motor 32 is driven under the control of the control unit 101. The flat screw 40 may be driven by the drive motor 32 via a speed reducer.

Spiral groove portions 42 are formed in the lower surface 48 of the flat screw 40 which is a surface intersecting the rotation axis RX. The communication path of the material supply unit 20 described above communicates with the groove portions 42 from a side surface of the flat screw 40. As shown in FIG. 2, in the present embodiment, three groove portions 42 are formed so as to be separated from each other by ridge portions 43. The number of groove portions 42 is not limited to three, and may be one or two or more. A shape of the groove portions 42 is not limited to a spiral shape, and may be a helical shape or an involute curve shape, or may be a shape extending so as to draw an arc from a central portion toward an outer periphery.

The lower surface 48 of the flat screw 40 faces the upper surface 52 of the screw facing portion 50, and a space is formed between the groove portions 42 in the lower surface 48 of the flat screw 40 and the upper surface 52 of the screw facing portion 50. In the shaping unit 110, the raw material MR is supplied from the material supply unit 20 to material inlets 44 shown in FIG. 2 in the space between the flat screw 40 and the screw facing portion 50.

A heater 58 for heating the raw material MR supplied into the groove portions 42 of the rotating flat screw 40 is embedded in the screw facing portion 50. A plurality of guide grooves 54 coupled to a communication hole 56 and extending in a spiral shape from the communication hole 56 toward the outer periphery are formed in the screw facing portion 50. One end of the guide groove 54 may not be coupled to the communication hole 56. The guide grooves 54 may be omitted. The heater 58 may be divided into two heaters, that is, an inner heater disposed at a position close to the communication hole 56 and an outer heater disposed outside the inner heater, and may be configured to be individually temperature-adjustable.

The raw material MR supplied into the groove portions 42 of the flat screw 40 flows along the groove portions 42 by the rotation of the flat screw 40 while being melted in the groove portions 42, and is guided as the shaping material to a central portion 46 of the flat screw 40. The paste-like shaping material that flows into the central portion 46 and exhibits fluidity is supplied to the discharge unit 60 via the communication hole 56 provided at a center of the screw facing portion 50 shown in FIG. 3. In the shaping material, all types of substances constituting the shaping material may not be melted. The shaping material may be converted into a state having fluidity as a whole by melting at least a part of types of the substances constituting the shaping material.

The discharge unit 60 includes a nozzle 61 that discharges the shaping material, a flow path 65 for the shaping material that is provided between the flat screw 40 and the nozzle 61, a flow rate adjusting unit 70 that opens and closes the flow path 65, and a suction unit 75 that sucks and temporarily stores the shaping material. The nozzle 61 is coupled to the communication hole 56 of the screw facing portion 50 through the flow path 65. The nozzle 61 discharges the shaping material generated in the shaping material generation unit 30 from a discharge port 62 at a tip toward the stage 210. A heater that inhibits a decrease in temperature of the shaping material discharged onto the stage 210 may be disposed around the nozzle 61.

The flow rate adjusting unit 70 changes an opening degree of the flow path 65 by rotating in the flow path 65. In the present embodiment, the flow rate adjusting unit 70 is implemented by a butterfly valve. The flow rate adjusting unit 70 is driven by a first driving unit 74 under the control of the control unit 101. The first driving unit 74 is implemented by, for example, a stepping motor. The control unit 101 can adjust a flow rate of the shaping material flowing from the shaping material generation unit 30 to the nozzle 61, that is, a flow rate of the shaping material discharged from the nozzle 61, by controlling a rotation angle of the butterfly valve using the first driving unit 74. The flow rate adjusting unit 70 adjusts a flow rate of the shaping material and controls ON/OFF of an outflow of the shaping material.

The suction unit 75 is coupled between the flow rate adjusting unit 70 and the discharge port 62 in the flow path 65. The suction unit 75 temporarily sucks the shaping material in the flow path 65 when the discharge of the shaping material from the nozzle 61 is stopped, thereby preventing an elongating phenomenon that the shaping material drips to pull a thread from the discharge port 62. In the present embodiment, the suction unit 75 is implemented by a plunger. The suction unit 75 is driven by a second driving unit 76 under the control of the control unit 101. The second driving unit 76 is implemented by, for example, a stepping motor, a rack and pinion mechanism that converts a rotational force of the stepping motor into a translational motion of a plunger, or the like.

In the present embodiment, the discharge unit 60 is provided with one nozzle 61. Alternatively, the discharge unit 60 may include a plurality of nozzles 61 including discharge ports 62 having different shapes and sizes. In this case, the flow path 65 is branched so as to communicate with the nozzles 61, and a flow path switching valve for switching the nozzles to be used is provided at the branched portion. Then, suction units 75 are individually provided so as to correspond to the respective nozzles. One flow rate adjusting unit 70 may be provided in common on upstream of the flow path switching valve, or may be individually provided so as to correspond to each nozzle. The flow path switching valve may also have a flow rate adjusting function of adjusting the flow rate of the shaping material flowing out to each nozzle.

In the present embodiment, the three-dimensional shaping apparatus 100 includes one shaping unit 110. However, the three-dimensional shaping apparatus 100 may include a plurality of shaping units 110. In this way, different shaping materials can be discharged from the discharge units 60 provided in the shaping units 110. In this case, each nozzle 61 may be provided in each of the discharge units 60 as described above.

The stage 210 is disposed at a position facing the discharge port 62 of the nozzle 61. In the first embodiment, a shaping surface 211 of the stage 210 facing the discharge port 62 of the nozzle 61 is disposed so as to be parallel to the X and Y directions, that is, the horizontal directions. In three-dimensional shaping processing described later, the three-dimensional shaping apparatus 100 shapes a three-dimensional shaped object by discharging the shaping material from the discharge unit toward the shaping surface 211 of the stage 210 and laminating layers. The stage 210 may be provided with a heater for preventing rapid cooling of the shaping material discharged onto the stage 210.

The moving mechanism 230 changes a relative position between the stage 210 and the nozzle 61. In the present embodiment, a position of the nozzle 61 is fixed, and the moving mechanism 230 moves the stage 210. The moving mechanism 230 is implemented by a three-axis positioner that moves the stage 210 in three-axis directions of the X, Y, and Z directions by a driving force of three motors. The moving mechanism 230 changes a relative positional relationship between the nozzle 61 and the stage 210 under the control of the control unit 101. In the present specification, unless otherwise specified, a movement of the nozzle 61 means that the nozzle 61 is moved relative to the stage 210.

In another embodiment, instead of the configuration in which the stage 210 is moved by the moving mechanism 230, a configuration in which the moving mechanism 230 moves the nozzle 61 relative to the stage 210 in a state where the position of the stage 210 is fixed may be adopted. A configuration in which the stage 210 is moved in the Z direction and the nozzle 61 is moved in the X and Y directions by the moving mechanism 230, or a configuration in which the stage 210 is moved in the X and Y directions and the nozzle 61 is moved in the Z direction by the moving mechanism 230 may be adopted. With these configurations, the relative positional relationship between the nozzle 61 and the stage 210 can be changed.

The control unit 101 is a control device that controls an overall operation of the three-dimensional shaping apparatus 100. The control unit 101 is implemented by a computer including one or a plurality of processors, a storage device, and an input and output interface that inputs and outputs a signal to and from an outside. The control unit 101 is coupled to a display unit 105 configured by a liquid crystal display, an organic EL display, or the like. The control unit 101 functions as a shaping data generation unit 102 that generates shaping data and a display control unit 103 that controls the display unit 105 by the processor executing a program or a command read into the storage device. Instead of being implemented by a computer, the control unit 101 may be implemented by a configuration of combining a plurality of circuits for implementing at least a part of the functions. The control unit 101 is also referred to as an information processing apparatus.

The shaping data generation unit 102 generates shaping data having a plurality of partial routes for moving the discharge unit 60 by the moving mechanism 230. The control unit 101 controls the shaping unit 110 including the flow rate adjusting unit 70 and the discharge unit 60 and the moving mechanism 230 according to the shaping data generated by the shaping data generation unit 102 to shape the three-dimensional shaped object on the stage 210.

The shaping data generation unit 102 generates the shaping data by using shape data such as three-dimensional CAD data representing a shape of the three-dimensional shaped object. The shaping data includes route information representing a movement route of the discharge unit 60 and discharge amount information representing a discharge amount of the shaping material in each movement route. The movement route of the discharge unit 60 refers to a route along which the nozzle 61 moves on the shaping surface 211 of the stage 210 while discharging the shaping material. The shape data such as the three-dimensional CAD data from which the shaping data is generated is referred to as first shape data.

The route information includes the plurality of partial routes. Each partial route is a linear route represented by a start point and an end point. The discharge amount information is individually associated with each partial route. In the present embodiment, the discharge amount represented by the discharge amount information is an amount of the shaping material discharged per unit time in the partial route. In another embodiment, a total amount of the shaping material discharged in all partial routes may be associated with each partial route as the discharge amount information.

Figure 4:
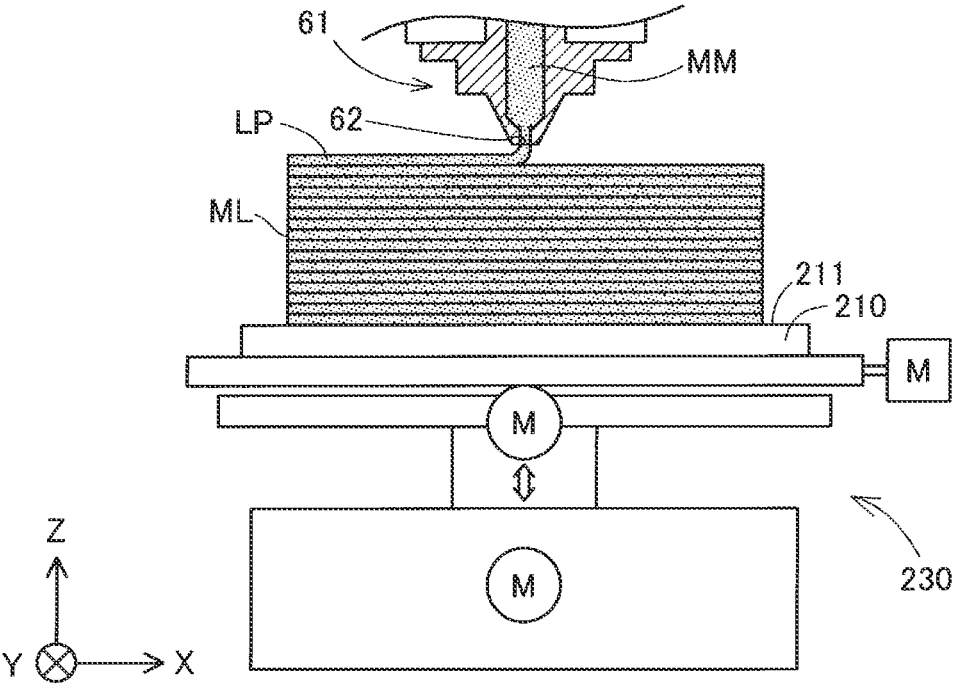
FIG. 4 is a diagram schematically showing a state where a three-dimensional shaped object is being shaped.

FIG. 4 is a diagram schematically showing a state where a three-dimensional shaped object is being shaped in the three-dimensional shaping apparatus 100. In the three-dimensional shaping apparatus 100, as described above, in the shaping material generation unit 30, the raw material MR in a solid state supplied to the groove portions 42 of the flat screw 40 is melted to generate a shaping material MM. The control unit 101 causes the nozzle 61 to discharge the shaping material MM while changing the position of the nozzle 61 relative to the stage 210 in a direction along the shaping surface 211 of the stage 210 while maintaining a distance between the shaping surface 211 of the stage 210 and the nozzle 61. The shaping material MM discharged from the nozzle 61 is continuously deposited in a moving direction of the nozzle 61. By scanning of the nozzle 61, a linear portion LP that is a shaped portion linearly extending along a scanning route of the nozzle 61 is formed.

The control unit 101 repeats the scanning of the nozzle 61 to form a layer ML. The control unit 101 moves the position of the nozzle 61 relative to the stage 210 in the Z direction after one layer ML is formed. Then, the three-dimensional shaped object is formed by further laminating a layer ML on the layer ML formed.

For example, the control unit 101 may temporarily interrupt the discharge of the shaping material from the nozzle 61 when the nozzle 61 moves in the Z direction in a case of completing one layer ML or when there are a plurality of independent shaping regions in each layer. In this case, the flow path 65 is closed by the flow rate adjusting unit 70, and the discharge of the shaping material MM from the discharge port 62 is stopped. After changing the position of the nozzle 61, the control unit 101 opens the flow path 65 by the flow rate adjusting unit 70 to restart the deposition of the shaping material MM from a position of the nozzle 61 after change.

Figure 5:
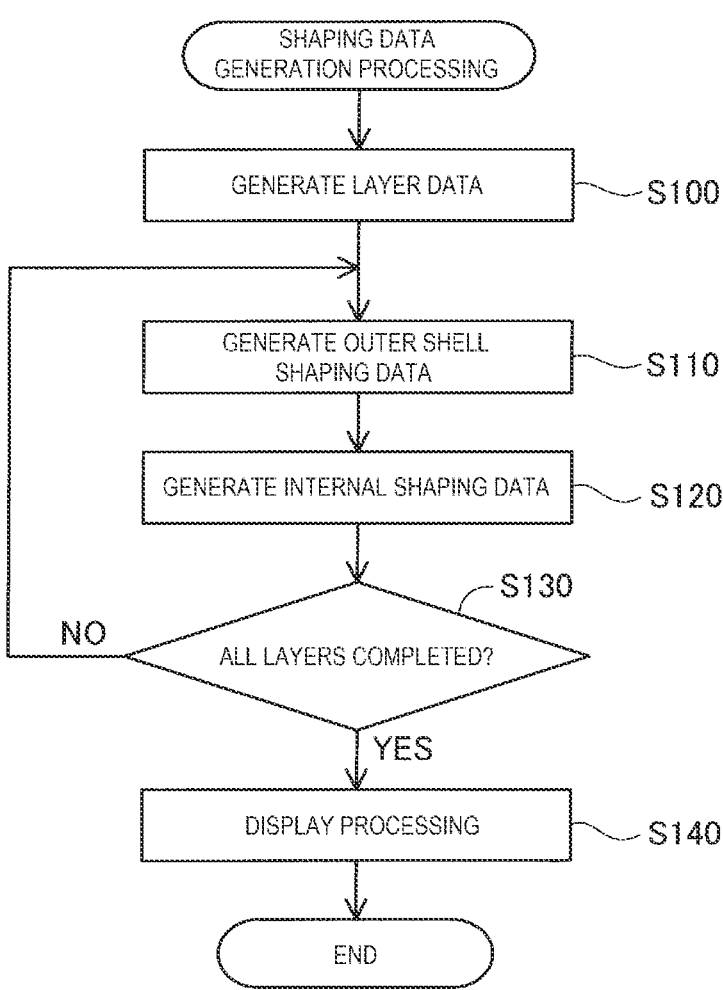
FIG. 5 is a flowchart of shaping data generation processing.

FIG. 5 is a flowchart of shaping data generation processing executed by the control unit 101. The shaping data generation processing is processing of generating the shaping data to be used for shaping the three-dimensional shaped object prior to the shaping of the three-dimensional shaped object, and implementing an information display method of visually displaying, on the display unit 105, the shape of the three-dimensional shaped object represented by the shaping data.

Figure 6:
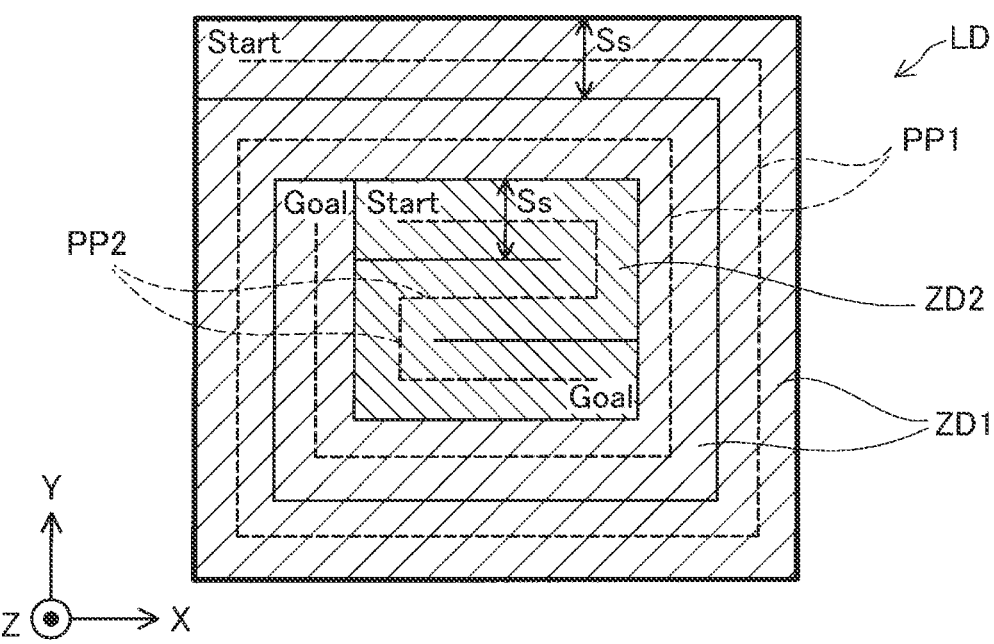
FIG. 6 is a diagram showing an example of layer data.

As shown in FIG. 5, in step S100, the shaping data generation unit 102 analyzes the three-dimensional CAD data representing the shape of the three-dimensional shaped object input from the outside, that is, the first shape data, and generates layer data obtained by slicing the three-dimensional shaped object into a plurality of layers along the XY plane. The layer data is data representing an outer shell of the three-dimensional shaped object in the XY plane. In FIG. 6, a portion corresponding to the outer shell represented by the layer data LD is indicated by a thick line. FIG. 6 is a diagram showing an example of the layer data LD.

In step S110, the shaping data generation unit 102 generates outer shell shaping data. The outer shell shaping data is data for forming an outer shell region in contact with an inner side of the outer shell represented by the layer data LD. The outer shell region is a region influencing an appearance of the three-dimensional shaped object. The outer shell shaping data includes route information for shaping an outermost periphery along the outer shell of the three-dimensional shaped object. The outer shell shaping data may include not only the route information for shaping the outermost periphery of the three-dimensional shaped object, but also route information including one inner periphery of the outermost periphery. The number of route information for forming the outer shell region may be freely set.

FIG. 6 shows the example in which outer shell shaping data ZD1 is implemented by outermost route information and route information for one inner periphery thereof. Each of these pieces of route information includes a plurality of partial routes PP1 for shaping the outer shell region. As described above, each partial route PP1 is a linear route. Each partial route PP1 is associated with a discharge amount corresponding to an amount by which the shaping material deposited on the stage 210 has a desired width Ss as discharge amount information.

In step S120, the shaping data generation unit 102 generates internal shaping data. The internal shaping data is data for shaping an internal region, which is a region inside the outer shell represented by the layer data LD and is a region other than the outer shell region in the three-dimensional shaped object. The internal region is a region that has a greater influence on strength of the three-dimensional shaped object than on the appearance of the three-dimensional shaped object.

FIG. 6 shows the example in which internal shaping data ZD2 is represented inside the outer shell shaping data ZD1.

In FIG. 6, the route information for filling the internal region represented by the internal shaping data ZD2 is formed in a manner of meandering by a plurality of partial routes PP2. As described above, each partial route PP2 is a linear route. Each partial route PP2 is associated with a discharge amount corresponding to an amount by which the shaping material deposited on the stage 210 has a desired width Ss as discharge amount information. In the present embodiment, a width of the route formed in the outer shell shaping data ZD1 and a width of the route formed in the internal shaping data ZD2 are the same width Ss, but may be different from each other.

Hereinafter, the outer shell shaping data generated in step S110 and the internal shaping data generated in step S120 are collectively referred to as "shaping data". The shaping data includes route data representing a route including a plurality of partial routes in which the discharge unit 60 moves while discharging the shaping material, and discharge amount data including discharge amount information representing a discharge amount of the shaping material in each partial route. In the present embodiment, the shaping data further includes data indicating a control position at which the discharge of the shaping material is controlled by the flow rate adjusting unit 70 or the suction unit 75, and apparatus control data for controlling each unit of the three-dimensional shaping apparatus 100 such as the heater 58 and the drive motor 32.

In step S130, the shaping data generation unit 102 determines whether the above processing is completed on all layer data. When the processing is not completed on all layer data, the shaping data generating unit 102 repeats the processing from step S110 to step S120 on next layer data. When the generation of the shaping data is completed for all layer data, in step S140, the display control unit 103 of the control unit 101 executes display processing of displaying a display screen visually representing the shaping data on the display unit 105. Details of the display processing will be described below. When the display processing is ended by the user, the shaping data generation unit 102 ends the shaping data generation processing.

Figure 7:
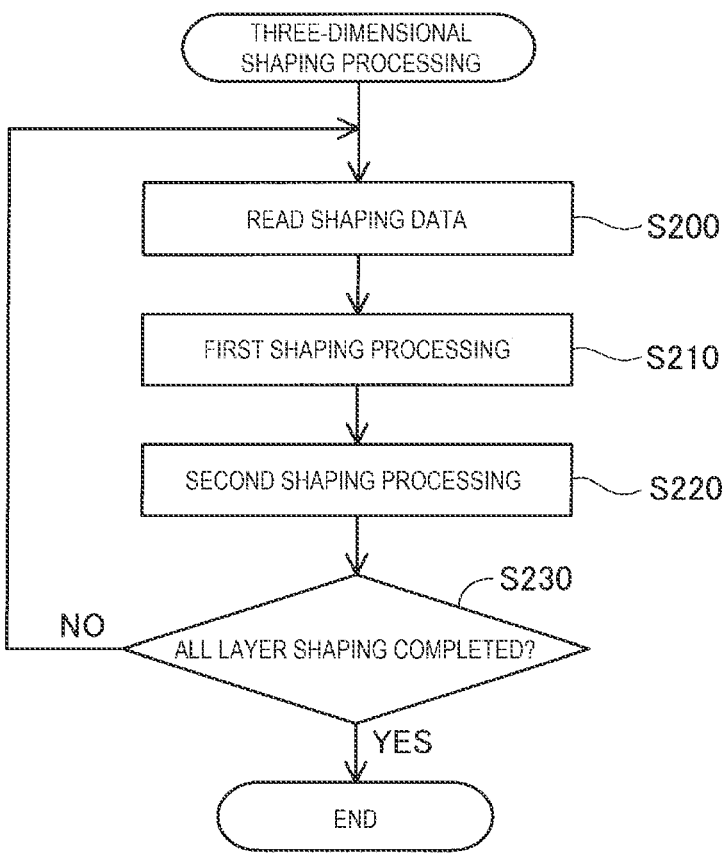
FIG. 7 is a flowchart of three-dimensional shaping processing.

FIG. 7 is a flowchart of the three-dimensional shaping processing executed by the control unit 101. The three-dimensional shaping processing is processing executed by the control unit 101 using the shaping data generated in the shaping data generation processing shown in FIG. 5. By executing the shaping data generation processing shown in FIG. 5 and the three-dimensional shaping processing shown in FIG. 7, a method for manufacturing a three-dimensional shaped object by the three-dimensional shaping apparatus 100 is implemented.

In step S200, the control unit 101 acquires the shaping data generated by the shaping data generation processing described above. Then, the outer shell shaping data and the internal shaping data described above are read from the shaping data for one layer among a plurality of layers constituting the three-dimensional shaped object. In the present embodiment, first, the control unit 101 reads shaping data of a lowermost layer in the gravity direction among the plurality of layers constituting the three-dimensional shaped object.

In step S210, the control unit 101 executes first shaping processing. In the first shaping processing, the control unit 101 controls the moving mechanism 230 and the discharge unit 60 according to the partial route included in the outer shell shaping data and the discharge amount information associated with each partial route to form the outer shell region for a current layer.

In step S220, the control unit 101 executes second shaping processing. In the second shaping processing, the control unit 101 controls the moving mechanism 230 and the discharge unit 60 according to the partial route included in the internal shaping data and the discharge amount information associated with each partial route to form the internal region for a current layer.

In step S230, the control unit 101 determines whether the shaping is completed for all layers. When the shaping is not completed for all layers, the control unit 101 returns the processing to step S200, reads the shaping data for the next layer, that is, a layer adjacent to the current layer on the upper side in the gravity direction, and executes processing of step S210 and step S220. In this case, in step S210, prior to the discharge of the shaping material from the discharge unit 60, the control unit 101 controls the moving mechanism 230 to raise the position of the nozzle 61 by one layer from the stage 210. When the shaping is completed for all layers, the control unit 101 ends the three-dimensional shaping processing.

Hereinafter, the display processing executed by the display control unit 103 in step S140 of FIG. 5 will be described with reference to FIGS. 8 to 13. In the display processing, the display control unit 103 can cause the display unit 105 to display various display screens described below. Display screens can be switched by a user performing a predetermined operation on the control unit 101. The display control unit 103 may not be able to display all display screens described below, and may be able to display any one or more display screens.

Figure 8:
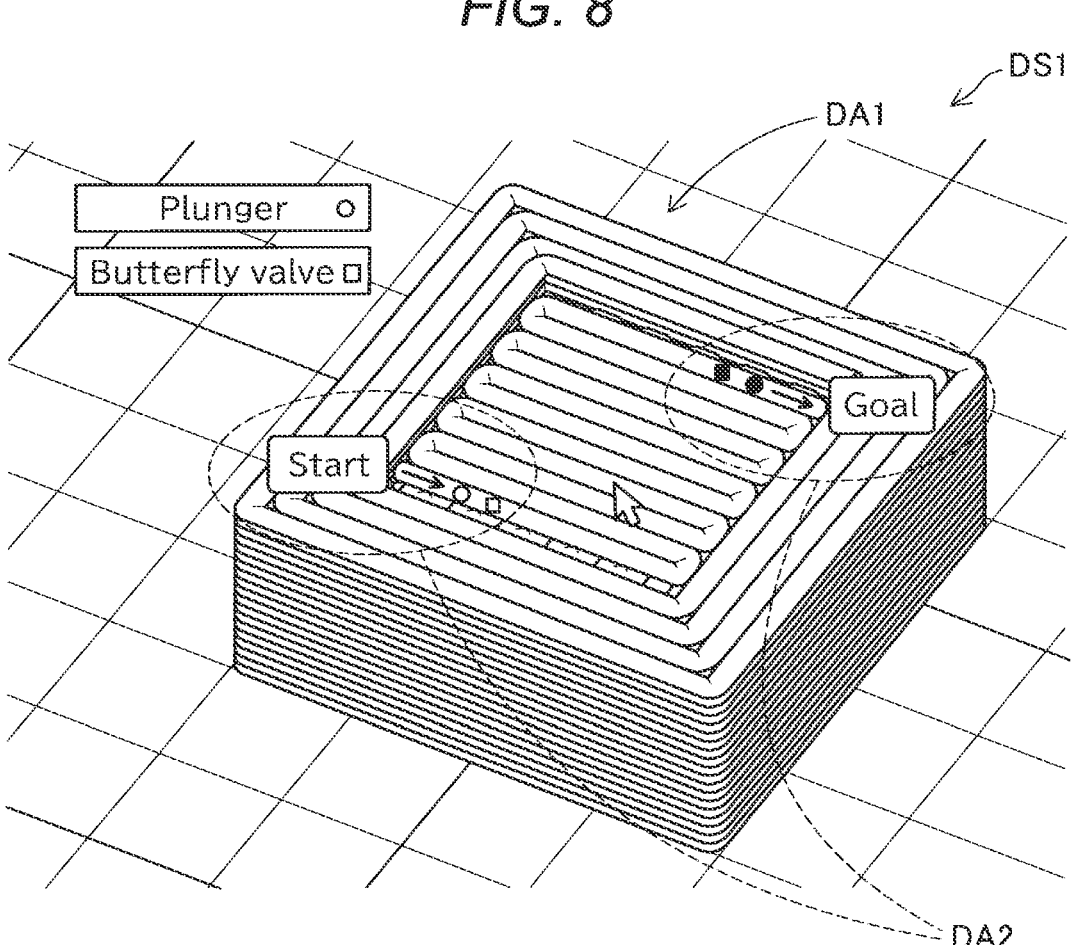
FIG. 8 is a diagram showing an example of a first display screen.

FIG. 8 is a diagram showing an example of a first display screen DS1 displayed on the display unit 105 by the display control unit 103. The display screens shown in FIG. 8 and subsequent figures include a first display region DA1 and a second display region DA2, and display contents on the second display region DA2 are mainly different from each other. The first display region DA1 is a region for displaying at least a part of second shape data. The second shape data is data representing the shape of the three-dimensional shaped object and including the route information. More specifically, in the present embodiment, the second shape data is data in which the shape of the three-dimensional shaped object is three-dimensionally represented by thickening the movement route included in the route information according to the discharge amount of the shaping material represented by the discharge amount data. The second display region DA2 is a region for displaying at least a part of information included in the shaping data.

On the first display region DA1 of the first display screen DS1 shown in FIG. 8, a part of the three-dimensional shaped object is three-dimensionally displayed as the second shape data. The user can cause, by using an input device such as a mouse or a keyboard, any region, any cross section, any layer, and any partial route of the three-dimensional shaped object to be displayed on the first display region DA1. On the first display region DA1, the entire three-dimensional shaped object may be displayed as the second shape data.

On the second display region DA2 of the first display screen DS1 shown in FIG. 8, the control position for controlling the discharge of the shaping material is displayed in a manner of overlapping the corresponding position of the second shape data displayed on the first display region DA1. Specifically, in a route including a plurality of continuous partial routes, a control position at which the discharge of the shaping material is turned on, that is, a start point of the shaping is displayed as "Start", and a control position at which the discharge of the shaping material is turned off, that is, an end point of the shaping is displayed as "Goal". On the second display region DA2, the moving direction of the discharge unit 60 at the start point and the moving direction of the discharge unit 60 at the end point are indicated by arrows. Further, the control position of the suction unit 75 and the control position of the flow rate adjusting unit 70 are displayed on the second display region DA2. Specifically, the control position of the suction unit 75 is indicated by a circle, and the control position of the flow rate adjusting unit 70 is indicated by a square. In the example shown in FIG. 8, a white circle indicates a position at which the shaping material is discharged by the suction unit 75, and a black circle indicates a position at which the shaping material is sucked by the suction unit 75. A white square indicates a position at which the flow rate adjusting unit 70 is open to a designated opening degree, and a black square indicates a position at which the flow rate adjusting unit 70 is closed. Each control position shown in FIG. 8 is an example, and does not represent a control position for implementing a shape shown in FIG. 8. Each mark is also an example, and the shape and color of each mark can be changed as appropriate.

When the display control unit 103 causes the display unit 105 to display such a first display screen DS1, the user can easily check information related to control of the discharge unit 60, such as the moving direction of the discharge unit 60, and the control positions of the flow rate adjusting unit 70 and the suction unit 75. By displaying the control position in a manner of overlapping the corresponding position of the three-dimensional shaped object displayed on the first display region DA1, the moving direction and the control position of the discharge unit 60 can be visually and easily confirmed.

The display control unit 103 may display the control position displayed on the second display region DA2 in a changeable manner. The user selects a control position to be changed using an input device such as a mouse or a keyboard, and moves the control position to a new position. The display control unit 103 updates the shaping data based on the control position after change. In this way, the user can intuitively and easily change the control position.

FIG. 9 is a diagram showing an example of a second display screen DS2 displayed on the display unit 105 by the display control unit 103. On the first display region DA1 of the second display screen DS2, similar to the first display screen DS1, the shape of the three-dimensional shaped object is three-dimensionally displayed. In addition, on the second display region DA2, at least a part of the information included in the shaping data is listed and displayed. The information includes, for example, at least one of (1) apparatus information related to the three-dimensional shaping apparatus 100 that acquires shaping data and shapes a three-dimensional shaped object, (2) shaping condition information related to shaping conditions of the three-dimensional shaped object, and (3) control information for controlling the three-dimensional shaping apparatus 100.

The apparatus information includes, for example, (i) an identifier such as a name or a model number of the three-dimensional shaping apparatus 100 to be used, (ii) an identifier indicating the discharge unit 60 or the flat screw 40 to be used when the three-dimensional shaping apparatus 100 includes a plurality of discharge units 60, and (iii) an identifier indicating the nozzle 61 to be used when the discharge unit 60 includes a plurality of nozzles 61.

The shaping condition information includes, for example, (i) a material to be used, (ii) a temperature of the stage 210, (iii) a set temperature of a chamber when the three-dimensional shaping apparatus 100 is accommodated in the chamber, and (iv) a temperature of the heater of each part.

The control information includes, for example, (i) the moving direction of the discharge unit 60, (ii) a moving speed of the discharge unit 60, (ii) a rotation speed of the flat screw 40, (iii) a discharge pressure or a discharge speed of the shaping material, (iv) the control position of the flow rate adjusting unit 70, (v) the control position of the suction unit 75, and (vi) a position at which the discharge unit 60 is moved along the Z direction.

When the display control unit 103 causes the display unit 105 to display the second display screen DS2, the user can check various pieces of information related to the three-dimensional shaping in advance.

In the example shown in FIG. 9, the second display region DA2 including the various kinds of information described above is displayed so as to overlap the first display region DA1. A display position of the second display region DA2 can be moved by the user using an input device such as a mouse. On the second display screen DS2, the second display region DA2 and the first display region DA1 may be displayed at different positions in a manner of not overlapping each other.

The display control unit 103 may display, on the second display region DA2, information included in the shaping data corresponding to a selected position of the second shape data displayed on the first display region DA1. In this way, the user can easily confirm various kinds of information in a desired partial route only by designating, on the second display screen DS2, a desired position of the three-dimensional shaped object displayed on the first display region DA1.

The display control unit 103 may display the information displayed on the second display region DA2 in a changeable manner. The user selects information to be changed using an input device such as a mouse or a keyboard, and changes the selected information. Then, the display control unit 103 updates the shaping data based on the changed information. In this way, the user can easily change various types of information related to the three-dimensional shaping. When the shape of the three-dimensional shaped object changes due to such a change in information, the display control unit 103 may display, on the first display region DA1, the shape of the three-dimensional shaped object after change as the second shape data. In this way, the user can easily confirm the shape of the three-dimensional shaped object after change.

Figure 10:
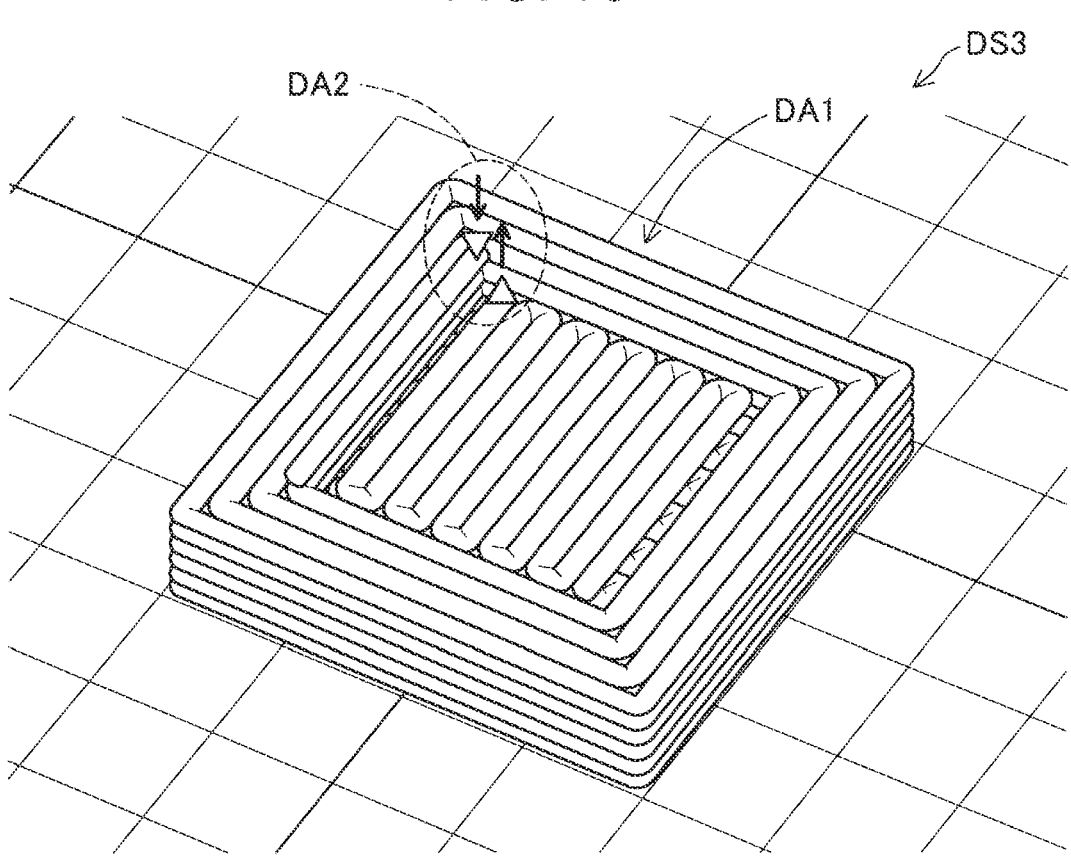
FIG. 10 is a diagram showing an example of a third display screen.

FIG. 10 is a diagram showing an example of a third display screen DS3 displayed on the display unit 105 by the display control unit 103. On the first display region DA1 of the third display screen DS3, similar to the first display screen DS1, the shape of the three-dimensional shaped object is three-dimensionally displayed. In addition, on the second display region DA2, a position at which the discharge unit 60 is moved upward or downward is displayed. Specifically, a control position for moving the discharge unit 60 upward and a control position for moving the discharge unit 60 downward are displayed in a manner of overlapping a start point or an end point of a certain route displayed on the first display region DA1. A position at which the discharge unit 60 is moved along the vertical direction in this way is also referred to as a retraction position. In the example shown in FIG. 10, a position at which the discharge unit 60 is moved upward is indicated by an upward arrow and a white triangle, and a position at which the discharge unit 60 is moved downward is indicated by a downward arrow and a white inverted triangle. The retraction position may be displayed only by an arrow, or may be displayed only by a triangle mark. When an arrow is displayed, the retraction position may be displayed by a circle or a square instead of a triangle.

The display control unit 103 may cause the retraction position to be displayed on the second display region DA2 in a changeable manner. The user selects a retraction position to be changed using an input device such as a mouse or a keyboard, and moves the retraction position to a new position. The display control unit 103 updates the shaping data based on the changed information.

Figure 11:
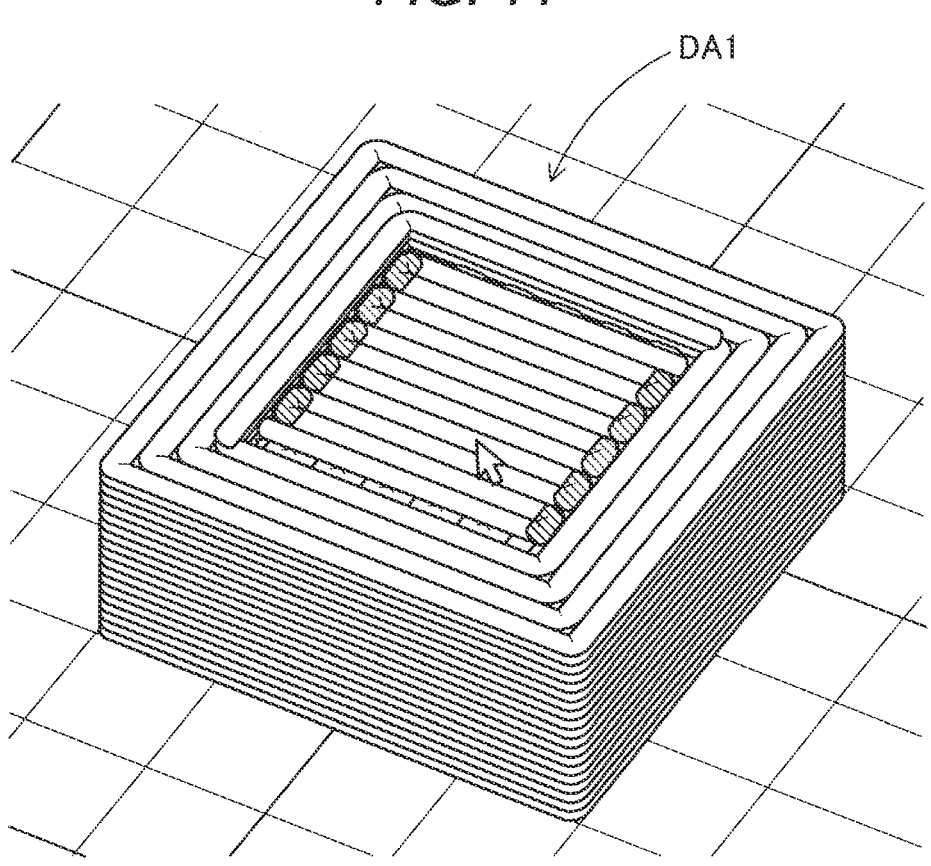
FIG. 11 is a first diagram showing another display example of a first display region.

FIG. 11 is a first diagram showing another display example of the first display region DA1. On the first display region DA1 of each display screen shown in FIGS. 8 to 10, at least a part of partial routes constituting the three-dimensional shaped object may be displayed in different colors. FIG. 11 shows an example in which adjacent partial routes are displayed in different colors in the internal region constituting the three-dimensional shaped object. By displaying the partial routes in different colors in this manner, the user can easily determine a coupling state between the partial routes.

Figure 12:
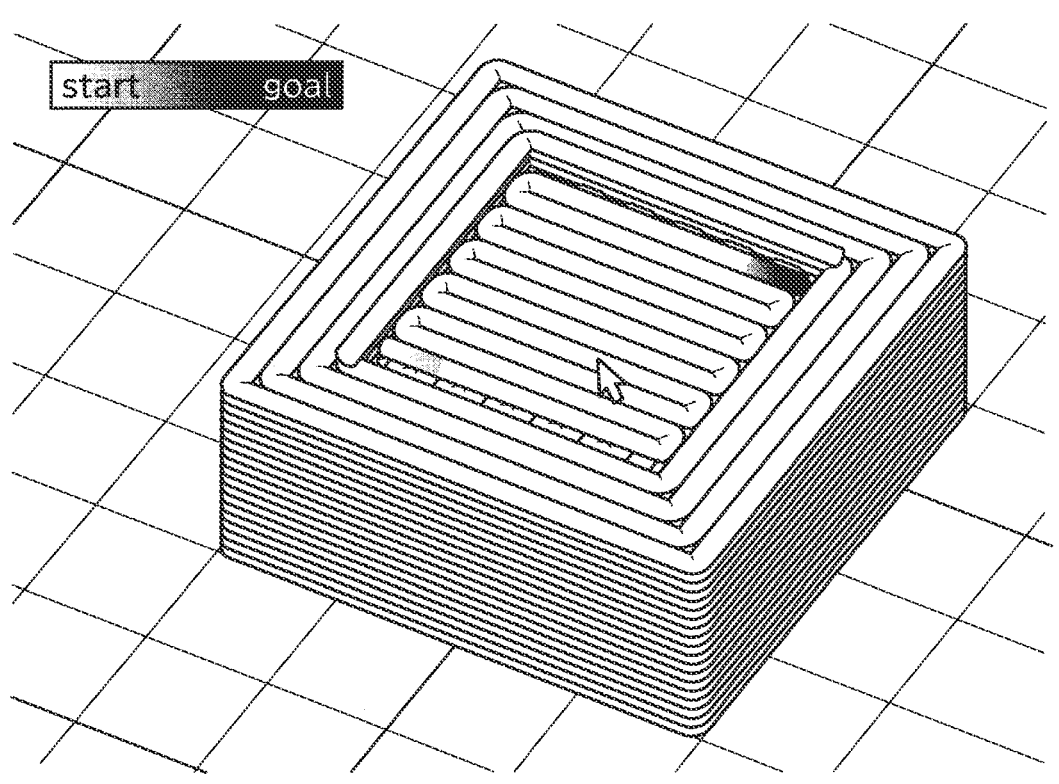
FIG. 12 is a first diagram showing another example of a display screen.

FIG. 12 is a first diagram showing another example of the display screen. FIG. 12 shows an example in which a series of movement routes forming the internal region is represented by gradation. In the example shown in FIG. 12, the color is displayed in a manner of gradually becoming white toward the start point, and the color is displayed in a manner of gradually becoming black toward the end point. However, for convenience of illustration, in FIG. 12, the color of an intermediate portion of the route is omitted.

Figure 13:
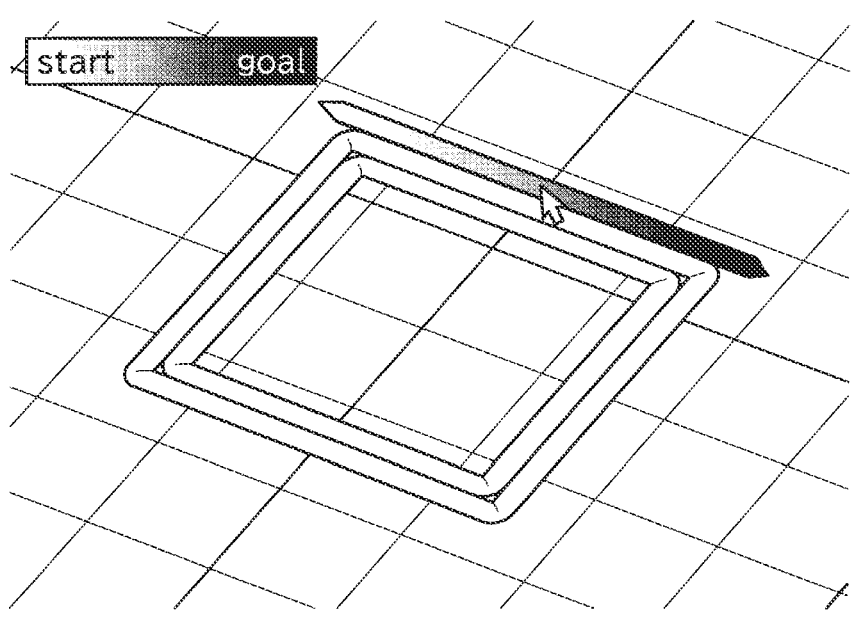
FIG. 13 is a second diagram showing another example of the display screen.

FIG. 13 is a second diagram showing another example of the display screen. FIG. 13 illustrates an example in which the start point and the end point of one partial route are represented by an elongated figure displayed in parallel to the partial route. In the elongated figure, the start point and the end point of the corresponding partial route are represented by different colors. In FIG. 13, the start point is represented by white, the end point is represented by black, and the intermediate portion therebetween is represented by gradation.

An example in which the second shape data representing the shape of the three-dimensional shaped object is stereoscopically displayed on the first display region DA1 of each display screen illustrated in FIGS. 8 to 13 is shown. In contrast, the second shape data may be displayed two-dimensionally on the first display region DA1. The second shape data may be displayed in a wire frame shape only by the route information without using the discharge amount information.

According to the first embodiment described above, the display unit 105 displays the display screen, including the first display region DA1 on which at least a portion of the second shape data representing the shape of the three-dimensional shaped object is displayed and the second display region DA2 on which at least a portion of the information included in the shaping data is displayed. Therefore, not only the shape of the three-dimensional shaped object but also detailed information included in the shaping data can be easily confirmed before the three-dimensional shaping is performed. As a result, for example, when the shaping fails and the shaping is performed again, it is possible to easily confirm which item of the shaping conditions or the information for controlling the three-dimensional shaping apparatus is to be changed and improved.

B. Other Embodiments (B1) In the above embodiment, the display unit 105 is coupled to the control unit 101. In contrast, the display unit 105 may be disposed outside the control unit 101 or the three-dimensional shaping system 10, and a display screen may be transmitted from the control unit 101 to the display unit 105 through a network.

(B2) In the above embodiment, a material is plasticized by the flat screw 40 in the shaping unit 110. In contrast, the shaping unit 110 may plasticize the material by, for example, rotating an in-line screw. A head used in a thermal dissolution lamination method may be adopted as the shaping unit 110.

(B3) In the above embodiment, the flow rate of the shaping material is adjusted by using the flow rate adjusting unit 70 configured by a butterfly valve. In contrast, the flow rate of the shaping material may be adjusted by controlling the number of rotations of the flat screw 40.

(B4) In the above embodiment, the control unit 101 executes both the shaping data generation processing and the three-dimensional shaping processing. In contrast, the shaping data generation processing and the three-dimensional shaping processing may be performed by different control units.

(B5) In the above embodiment, the control unit 110, which is also referred to as an information processing apparatus, functions as the shaping data generation unit 102 and the display control unit 103. In contrast, the control unit 110 may not have the function of the shaping data generation unit 102. In this case, the control unit 110 may acquire shaping data generated by another different control unit and execute the display processing.

(B6) In the above embodiment, a pellet-shaped ABS resin material is used as a raw material to be supplied to the material supply unit 20. In contrast, the three-dimensional shaping apparatus 100 can shape a three-dimensional shaped object using various materials such as a thermoplastic material, a metal material, and a ceramic material as a main material. Here, the "main material" means a main material for forming a shape of the three-dimensional shaped object, and means a material that occupies 50 wt % or more in the three-dimensional shaped object. The above shaping materials include those in which main materials are melted alone, and those in which some of the components contained together with the main materials are melted to form a paste.

When the thermoplastic material is used as the main material, the shaping material generation unit 30 generates the shaping material by plasticizing this material. The term "plasticize" means that heat is applied to the thermoplastic material to melt the material.

Examples of the thermoplastic material may include the following thermoplastic resin materials.

Example of Thermoplastic Resin Material

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyetherimide, and polyetheretherketone (PEEK).

Additives such as a wax, a flame retardant, an antioxidant, or a heat stabilizer may be mixed into the thermoplastic material, in addition to a pigment, a metal and a ceramic. In the shaping material generation unit 30, the thermoplastic material is converted into a melted state by being plasticized by the rotation of the flat screw 40 and heating of the heater 58. The shaping material generated by the melting of the thermoplastic material is discharged from the nozzle 61, and then cured due to a decrease in temperature.

It is desirable that the thermoplastic material is discharged from the nozzle 61 in a state of being melted completely by being heated to a temperature equal to or higher than a glass transition point thereof. For example, a glass transition point of the ABS resin is about 120° C., and it is desirable that the ABS resin is discharged from the nozzle 61 at about 200° C.

In the three-dimensional shaping apparatus 100, for example, the following metal material may be used as the main material instead of the above-described thermoplastic material. In this case, it is desirable that a component to be melted at the time of generating the shaping material is mixed into a powder material obtained by converting the following metal materials into a powder, and then the mixture is charged into the shaping material generation unit 30 as a raw material.

Example of Metal Material

Magnesium (Mg), iron (Fe), cobalt (Co), chromium (Cr), aluminum (Al), titanium (Ti), copper (Cu), nickel (Ni), or an alloy containing one or more of these metals Example of Alloy Maraging steel, stainless steel, cobalt chrome molybdenum, titanium alloy, nickel alloy, aluminum alloy, cobalt alloy, and cobalt chromium alloy.

In the three-dimensional shaping apparatus 100, a ceramic material may be used as the main material instead of the above-described metal material. Examples of the ceramic material include an oxide ceramic such as silicon dioxide, titanium dioxide, aluminum oxide, and zirconium oxide, and a non-oxide ceramic such as aluminum nitride. When the metal material or the ceramic material described above is used as the main material, the shaping material disposed on the stage 210 may be cured by irradiating with a laser or sintering with hot air.

A powder material of the metal material or the ceramic material that is charged as a raw material into the material supply unit 20 may be a mixed material obtained by mixing a plurality of types of powders including a powder of a single metal or a powder of an alloy and a powder of a ceramic material. The powder material of the metal material or the ceramic material may be coated with, for example, a thermoplastic resin shown in the above-described example, or a thermoplastic resin other than those in the above-described example. In this case, the thermoplastic resin may be melted in the shaping material generation unit 30 to exhibit fluidity.

The following solvents, for example, may be added to the powder material of the metal material or the ceramic material that is charged as a raw material into the material supply unit 20. The solvent can be used alone or in combination of two or more selected from the following.

Example of Solvent

Water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetate (for example, tetrabutylammonium acetate); and ionic liquids such as butyl carbitol acetate In addition, the following binder, for example, may be added to the powder material of the metal material or the ceramic material that is charged as a raw material into the material supply unit 20.

Example of Binder

Acrylic resin, epoxy resin, silicone resin, cellulose-based resin or other synthetic resin, polylactic acid (PLA), polyamide (PA), polyphenylene sulfide (PPS), polyether ether ketone (PEEK) or other thermoplastic resins

C. Other Aspects

The present disclosure is not limited to the above embodiments, and can be implemented by various configurations without departing from the gist of the present disclosure. For example, in order to solve a part or all of problems described above, or to achieve a part or all of effects described above, technical characteristics in the embodiments corresponding to technical characteristics in aspects to be described below can be replaced or combined as appropriate. In addition, when the technical characteristics are not described as essential in the present description, the technical characteristics can be appropriately deleted.

(1) According to a first aspect of the present disclosure, an information processing apparatus is provided. The information processing apparatus includes a display control unit configured to cause, based on shaping data, a display unit to display a display screen including a first display region and a second display region. The shaping data is generated based on first shape data representing a shape of a three-dimensional shaped object and includes route information representing a movement route of a discharge unit that moves while discharging a shaping material and discharge amount information representing a discharge amount of the shaping material in the movement route. On the first display region, at least a part of second shape data representing the shape of the three-dimensional shaped object and including the route information is displayed, and on the second display region, at least a part of information included in the shaping data is displayed.

According to such an aspect, since the display unit displays the display screen, including the first display region on which at least a portion of the second shape data representing the shape of the three-dimensional shaped object and including the route information is displayed and the second display region on which at least a portion of the information included in the shaping data is displayed, not only the shape of the three-dimensional shaped object but also detailed information included in the shaping data can be confirmed before shaping.

(2) In the above aspect, the shaping data may include, for example, at least one of (i) apparatus information related to the three-dimensional shaping apparatus that acquires shaping data and shapes a three-dimensional shaped object, (ii) shaping condition information related to shaping conditions of the three-dimensional shaped object, and (iii) control information for controlling the three-dimensional shaping apparatus. According to such an aspect, it is possible to check in advance various types of information related to three-dimensional shaping.

(3) In the above aspect, the shaping data may include data indicating a control position at which discharge of the shaping material is controlled, and the display control unit may display, on the second display region, at least one of a moving direction of the discharge unit and the control position. According to such an aspect, it is possible to easily check the information related to the control of the discharge unit.

(4) In the above aspect, the control position may include at least one of a control position of a suction unit that is provided in the discharge unit and sucks the shaping material and a control position of a flow rate adjusting unit that is provided in the discharge unit and adjusts a flow rate of the shaping material. According to such an aspect, the control positions of the suction unit and the flow rate adjusting unit can be checked in advance.

(5) In the above aspect, the display control unit may display, on the second display region, at least one of a moving direction of the discharge unit and the control position in a manner of overlapping at least the part of the second shape data on the first display region. According to such an aspect, it is possible to easily check the moving direction and the control position of the discharge unit.

(6) In the above aspect, the display control unit may display, on the second display region, information included in the shaping data corresponding to a selected position of the second shape data. According to such an aspect, it is possible to easily confirm various kinds of information at the selected position of the second shape data.

(7) In the above aspect, the display control unit may display the information displayed on the second display region in a changeable manner. According to such an aspect, it is possible to easily change various types of information related to three-dimensional shaping.

(8) According to a second aspect of the present disclosure, there is provided a three-dimensional shaping system including the information processing apparatus according to any one of the above-described aspects, and a three-dimensional shaping apparatus that acquires the shaping data and shapes the three-dimensional shaped object using the discharge unit.

(9) According to a third aspect of the present disclosure, an information display method is provided. The information display method includes displaying, on a display unit, a display screen including a first display region and a second display region based on shaping data. The shaping data is generated based on first shape data representing a shape of a three-dimensional shaped object and includes route information representing a movement route of a discharge unit that moves while discharging a shaping material and discharge amount information representing a discharge amount of the shaping material in the movement route. On the first display region, at least a part of second shape data representing the shape of the three-dimensional shaped object and including the route information is displayed, and on the second display region, at least a part of information included in the shaping data is displayed.

What is claimed is:

1. An information processing apparatus comprising:
a display controller configured to cause, based on shaping data, a display to display a display screen including a first display region and a second display region, wherein
the shaping data is generated based on first shape data representing a shape of a three-dimensional shaped object and includes route information representing a movement route, along which a discharge unit moves while discharging a shaping material, and discharge amount information representing a discharge amount of the shaping material along the movement route, on the first display region, at least a part of second shape data representing the shape of the three-dimensional shaped object and including the route information is displayed, on the second display region, textual information, which includes at least a part of information included in the shaping data, is displayed, the shaping data includes data indicating a control position, at which discharge of the shaping material is controlled and which is displayed on the movement route, the control position displayed on the movement route includes at least one of a control position of a suction unit that is provided in the discharge unit and sucks the shaping material and a control position of a flow rate adjusting unit that is provided in the discharge unit and adjusts a flow rate of the shaping material, the movement route includes a start position colored with a first color and an end position colored with a second color different from the first color, a first control position of the suction unit and a first control position of the flow rate adjusting unit are displayed near the start position in order, and a second control position of the flow rate adjusting unit and a second control position of the suction unit are displayed near the end position in order.

2. The information processing apparatus according to claim 1, wherein the shaping data include at least one of (1) apparatus information related to a three-dimensional shaping apparatus that acquires shaping data and shapes the three-dimensional shaped object, (2) shaping condition information related to shaping conditions of the three-dimensional shaped object, and (3) control information for controlling the three-dimensional shaping apparatus.

3. The information processing apparatus according to claim 1, wherein the display controller displays, on the second display region, at least one of a moving direction of the discharge unit and the control position.

4. The information processing apparatus according to claim 3, wherein the display controller displays, on the second display region, at least one of a moving direction of the discharge unit and the control position in a manner of overlapping at least the part of the second shape data on the first display region.

5. The information processing apparatus according to claim 1, wherein the display controller displays, on the second display region, information included in the shaping data corresponding to a selected position of the second shape data.

6. The information processing apparatus according to claim 1, wherein the display controller displays the information displayed on the second display region in a changeable manner.

7. A three-dimensional shaping system comprising:

the information processing apparatus according to claim 1; and a three-dimensional shaping apparatus that acquires the shaping data and shapes the three-dimensional shaped object using the discharge unit.

8. An information display method comprising:

displaying, on a display, a display screen including a first display region and a second display region based on shaping data, wherein the shaping data is generated based on first shape data representing a shape of a three-dimensional shaped object and includes route information representing a movement route, along which a discharge unit moves while discharging a shaping material, and discharge amount information representing a discharge amount of the shaping material along the movement route, on the first display region, at least a part of second shape data representing the shape of the three-dimensional shaped object and including the route information is displayed, on the second display region, textual information, which includes at least a part of information included in the shaping data, is displayed, the shaping data includes data indicating a control position, at which discharge of the shaping material is controlled and which is displayed on the movement route, the control position displayed on the movement route includes at least one of a control position of a suction unit that is provided in the discharge unit and sucks the shaping material and a control position of a flow rate adjusting unit that is provided in the discharge unit and adjusts a flow rate of the shaping material, the movement route includes a start position colored with a first color and an end position colored with a second color different from the first color, a first control position of the suction unit and a first control position of the flow rate adjusting unit are displayed near the start position in order, and a second control position of the flow rate adjusting unit and a second control position of the suction unit are displayed near the end position in order.

* * * * *